United States Patent
Kitabatake et al.

(10) Patent No.: US 9,440,641 B2
(45) Date of Patent: Sep. 13, 2016

(54) CONTROL DEVICE FOR HYBRID VEHICLE

(75) Inventors: Hirotatsu Kitabatake, Susono (JP);
Hideaki Komada, Gotenba (JP);
Yosuke Suzuki, Susono (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/412,236

(22) PCT Filed: Jul. 5, 2012

(86) PCT No.: PCT/JP2012/067160
§ 371 (c)(1),
(2), (4) Date: Dec. 31, 2014

(87) PCT Pub. No.: WO2014/006716
PCT Pub. Date: Jan. 9, 2014

(65) Prior Publication Data
US 2015/0291149 A1   Oct. 15, 2015

(51) Int. Cl.
*B60L 9/00* (2006.01)
*F02B 63/00* (2006.01)
(Continued)

(52) U.S. Cl.
CPC ............ *B60W 20/106* (2013.01); *B60K 6/445* (2013.01); *B60W 10/02* (2013.01); *B60W 10/06* (2013.01); *B60W 10/08* (2013.01); *B60W 20/10* (2013.01);
(Continued)

(58) Field of Classification Search
USPC .................................................. 701/22; 123/2
See application file for complete search history.

(56) References Cited

U.S. PATENT DOCUMENTS 5,788,006 A    8/1998  Yamaguchi
6,131,538 A *  10/2000 Kanai ................... B60K 6/445
                                              123/2

(Continued)

FOREIGN PATENT DOCUMENTS

CN   101855115 A    10/2010
JP   8-295140 A     11/1996
(Continued)

OTHER PUBLICATIONS

International Search Report issued Jul. 31, 2012 in PCT/JP2012/067160 Filed Jul. 5, 2012.
(Continued)

*Primary Examiner* — Thomas G Black
*Assistant Examiner* — Tyler Paige
(74) *Attorney, Agent, or Firm* — Oblon, McClelland, Maier & Neustadt, L.L.P (57) ABSTRACT

A vehicle control system is provided to improve a response of shifting operation of a drive mode while avoiding a shortage of drive force. The control system is applied to a hybrid vehicle having an internal combustion engine and two motors, and configured to select a drive mode from a mode where the vehicle is powered by the engine and a mode where the vehicle is powered by at least one of the motors while stopping the engine. The control system predicts a fact that the engine is expected to be started based on a detection value representing a running condition of the vehicle, during propulsion of the vehicle by the two motors while stopping the engine; shifts a drive mode to a mode where the vehicle is powered by one of the motors without using a power of the other motor to be used to start the engine; and starts the engine upon satisfaction of a condition for propelling the vehicle by the power of the other motor.

6 Claims, 10 Drawing Sheets

(51) Int. Cl.
*B60W 20/00* (2016.01)
*B60K 6/445* (2007.10)
*B60W 10/06* (2006.01)
*B60W 10/08* (2006.01)
*B60W 10/02* (2006.01)
*B60W 30/182* (2012.01)

(52) U.S. Cl.
CPC .............. *B60W 20/13* (2016.01); *B60W 20/40* (2013.01); *B60W 30/182* (2013.01); *B60W 2510/244* (2013.01); *B60W 2710/06* (2013.01); *Y02T 10/6239* (2013.01); *Y02T 10/6286* (2013.01); *Y02T 10/84* (2013.01); *Y10S 903/93* (2013.01)

(56) References Cited

U.S. PATENT DOCUMENTS

| | | |
|---|---|---|
| 2009/0082171 A1 | 3/2009 | Conlon et al. |
| 2009/0236160 A1 | 9/2009 | Tanaka et al. |
| 2010/0179714 A1* | 7/2010 | Tani ................ B60K 6/445 701/22 |
| 2010/0222953 A1 | 9/2010 | Tang |
| 2011/0040435 A1* | 2/2011 | Gillecriosd .......... B60K 6/442 701/22 |
| 2012/0083951 A1* | 4/2012 | Yang .................. B60K 6/445 701/22 |
| 2012/0116629 A1* | 5/2012 | Kamoshida ........... B60K 6/36 701/22 |
| 2013/0091694 A1* | 4/2013 | Hussain ............. B60W 20/00 29/593 |
| 2013/0311028 A1 | 11/2013 | Ohkuma et al. |
| 2014/0358340 A1* | 12/2014 | Radev ................ B60K 6/442 701/22 |
| 2015/0142232 A1* | 5/2015 | Tabata ............... B60K 6/445 701/22 |
| 2015/0217756 A1* | 8/2015 | Kitabatake .......... B60W 10/06 701/22 |

FOREIGN PATENT DOCUMENTS

| | | |
|---|---|---|
| JP | 2009-227147 A | 10/2009 |
| JP | 2010-269692 A | 12/2010 |
| JP | 2010-280334 A | 12/2010 |
| JP | 2011-231667 A | 11/2011 |
| JP | 2012-106712 A | 6/2012 |

OTHER PUBLICATIONS

Office Action issued Apr. 8, 2016 in U.S. Appl. No. 14/412,549.

* cited by examiner

| Drive Mode | MG1 | MG2 | B |
|---|---|---|---|
| 2nd EV Mode | ○ | ○ | ○ |
| ↓ | × | ○ | (○) |
| 1st EV Mode | × | ○ | × |

Fig. 11

CONTROL DEVICE FOR HYBRID VEHICLE

TECHNICAL FIELD

The present invention relates to a control system for a hybrid vehicle comprising a plurality of different power units such as an internal combustion engine and an electric motor.

BACKGROUND ART

A conventional hybrid vehicle is comprised of an internal combustion engine and an electric motor having a generating function, and a power of the engine is distributed to the motor side and an output side connected to drive wheels through a power distribution device as a differential mechanism. One of rotary members of the power distribution device is connected to the engine, and another rotary member of the power distribution device is connected to the motor. A drive mode of the hybrid vehicle can be selected from engine mode where the vehicle is powered only by the engine, motor mode where the vehicle is powered only by the motor, and hybrid mode where the vehicle is powered by both engine and motor.

For example, US 2009/0082171 A1 describes a hybrid vehicle comprised of an engine and two motors. The hybrid vehicle taught by US 2009/0082171 A1 is provided with a planetary gear set including a ring gear being selectively connectible to the first motor/generator and the engine through a clutch or brake, a sun gear being continuously connected to the second motor/generator, and a carrier member continuously connected to drive wheels through an output member. According to the teachings of US 2009/0082171 A1, the transmission includes clutches and brakes that are selectively engageable alone or in different combinations to connect different ones of the nodes to one another or to a stationary member, thereby establishing the various operating modes. Specifically, the operation mode is shifted among the two motor electric-only mode where both motor/generators are operated, the one motor electric-only mode where only the second motor/generator is operated, and the output split mode where the engine and the second motor/generator are operated.

Another example of the hybrid vehicle is described in Japanese Patent Laid-Open No. 08-295140. According to the teachings of Japanese Patent Laid-Open No. 08-295140, a planetary gear unit serves as the power distribution device in which a carrier is connected to an engine, a sun gear is connected to a generator/motor, and a torque of an electric motor is added to a torque of a ring gear. To this end, the engine and the carrier are selectively stopped by the brake. The power distribution device is used as a speed reducer by stopping the carrier by the brake when the vehicle is powered by the generator/motor while stopping the engine.

Thus, according to the teachings of the foregoing prior art documents, the drive mode is shifted by altering engagement states of the clutch and the brake. However, since output performances of the power units activated before and after the mode shifting are different, required drive force may not be achieved. That is, it is difficult to shift the drive mode promptly while avoiding shortage of the drive force. For example, in case of shifting from the motor only mode to the engine mode to establish large drive force, the motor has to be used to start the engine. In this case, the required drive force may not be achieved as a result of thus consuming the power of the motor to start the engine.

DISCLOSURE OF THE INVENTION

The present invention has been conceived noting the foregoing technical problem, and it is therefore an object of the present invention is to provide a control system for a hybrid vehicle comprising different kinds of power units, that is configured to reduce uncomfortable feeling resulting from shortage of drive force caused by shifting a drive mode from a predetermined mode to another mode where the vehicle is powered by different power unit.

The vehicle control system of the present invention is applied to a hybrid vehicle having an internal combustion engine and two motors, and configured to select a drive mode from a mode where the vehicle is powered by the engine, and a mode where the vehicle is powered by at least one of the motors while stopping the engine. In order to achieve the above-explained objectives, according to the present invention, the control system is comprised of: a prediction means that predicts a fact that the engine is expected to be started based on a detection value representing a running condition of the vehicle, during propelling the vehicle by the two motors while stopping the engine; a shifting means that shifts the drive mode to a mode where the vehicle is powered by one of the motors without using a power of the other motor to be used to start the engine; and a starting means that starts the engine upon satisfaction of a condition for propelling the vehicle by the power of the other motor.

The detection value includes at least one of a state of charge of a battery for supplying an electric power to the motors, a vehicle speed, a drive demand and a temperature of the motor. Specifically, the prediction means is configured to predict the fact that the engine is expected to be started given that the state of charge of the battery is lower than a threshold thereof, the vehicle speed is lower than the threshold thereof or the temperature is higher than a threshold thereof, and that the drive demand is smaller than a threshold thereof.

The threshold includes a first threshold value used to predict the fact that the engine is expected to be started. The starting means is configured to start the engine if the state of charge of the battery is lower than a second threshold value as a criterion to start the engine. In addition, the first threshold value is set to be larger than the second threshold value.

The first threshold value of the state of charge is raised from the low speed side to the high speed side.

The control system is further comprised of: a storing means that saves a change rate of the state of charge of the battery; and a threshold altering means configured to alter the first threshold value of the state of charge based on a change rate of the state of charge, and to shift the first threshold value if a decreasing rate of the state of charge is relatively large to a higher value than that of a case in which the decreasing rate of the state of charge is relatively small.

The control system is further comprised of: a storing means that saves a change rate of the vehicle speed; and a threshold altering means configured to alter the first threshold value of the state of charge based on a change rate of the vehicle speed, and to shift the first threshold value if a decreasing rate of the vehicle speed is relatively large to a higher value than that of a case in which the decreasing rate of the vehicle speed is relatively small.

The control system is further comprised of: an engagement element adapted to selectively halt a rotary shaft of the engine; and a disengaging means that brings the engagement element into disengagement in case the prediction means predicts a fact that the engine is expected to be started.

Thus, according to the present invention, the drive mode is shifted from the mode where the vehicle is powered by the engine to the mode where the vehicle is powered by at least one of the motors in case the prediction means predicts a fact that the engine is expected to be started. Therefore, the drive force will not fall short even when starting the engine by one of the motors. In addition, the drive mode may be maintained preliminary to the mode for propelling the vehicle by one of the motors until the engine is started by the starting means.

The control system is configured to predict the fact that the engine is expected to be started based on at least one of the state of charge of the battery, the vehicle speed, the drive demand and the temperature of the motor. Therefore, the electric power of the battery to be supplied to the motor can be ensured sufficiently even if the vehicle is propelled by only one of the motors. Thus, the drive force will not fall short even when starting the engine by the other motor. In addition, since the drive mode is shifted by the shifting means depending on the running condition of the vehicle, those two motors are allowed o be operated to propel the vehicle in an electrically efficient manner.

Specifically, the state of charge of the battery is determined by comparing to the second threshold value. Therefore, the electric power of the motor(s) generating the drive force will not fall short when starting the engine by the starting means. In addition, since the shifting means is configured to carry out the shifting operation based on the first threshold value that is larger than the second threshold value, the vehicle is allowed to be propelled in proper condition while generating the drive force by the motors in an electrically efficient manner.

As described, according to the present invention, the first threshold value of the SOC is differentiated depending on the vehicle speed. Specifically, the first threshold value is reduced within the low speed region and increased within the high speed region. Therefore, shortage of the drive force can be prevented even if the SOC is lowered by increment of vehicle speed. In addition, both motors are allowed to serve as power sources even if the SOC falls short within the low speed region. Therefore, the hybrid vehicle is allowed to be propelled in an electrically efficient manner.

In order to alter the first threshold value based on the decreasing rate of the SOC and the change rate of the vehicle speed, the control system of the present invention is provided with the threshold altering means. According to the present invention, therefore, the shifting means is allowed to carry out the shifting operation based on a driving tendency saved in the storing means. For this reason, shortage of the drive force due to the abrupt fall of the SOC can be prevented even if the acceleration is changed significantly and frequently.

As also described, the control system of the present invention is provided with the starting means configured to start the engine under the condition where the disengaging means brings the engagement element stopping rotation of the engine into disengagement and the switching means shift the drive mode to propel the vehicle by one of the motors. In this situation, the engine being idled can be started by the other motor that is not generating the drive force. According to the present invention, therefore, the engine can be started without delay. In addition, a temporal drop of the drive force, shocks and uncomfortable feeling resulting from starting the engine can be avoided.

DESCRIPTION OF THE PREFERRED EMBODIMENT(S)

Preferred examples of the control system according to the present invention will now be explained with reference to the accompanying drawings. The control system of the present invention is configured to shift a drive mode between EV (i.e., Electric Vehicle) mode where the hybrid vehicle is powered only by an electric motor and HV (i.e., Hybrid Vehicle) mode where the hybrid vehicle is powered by both electric motor and internal combustion engine. Specifically, the control system of the present invention is configured to shift the drive mode during running while starting the engine. The hybrid vehicle to which the present invention is applied is so called a "two-motor type" hybrid vehicle that is provided with different kinds of power units such as the internal combustion engine and two electric motors. That is, drive force(s) of different power unit(s) is/are used to propel the hybrid vehicle under those drive modes. Specifically, under the HV mode, the vehicle can be propelled not only by the power of the engine but also by the power of the motor. In turn, under the EV mode, the vehicle is propelled only by the power of the motor. In order to shift the drive mode between those modes, different engagement elements such as clutch and brakes are brought into engagement to deliver the power of the drive unit(s) to the drive wheels. In the following explanation, a running state where the vehicle is propelled under the EV mode will be called the "EV running", and a running state where the vehicle is propelled under the HV mode will be called the "HV running".

Figure 6:
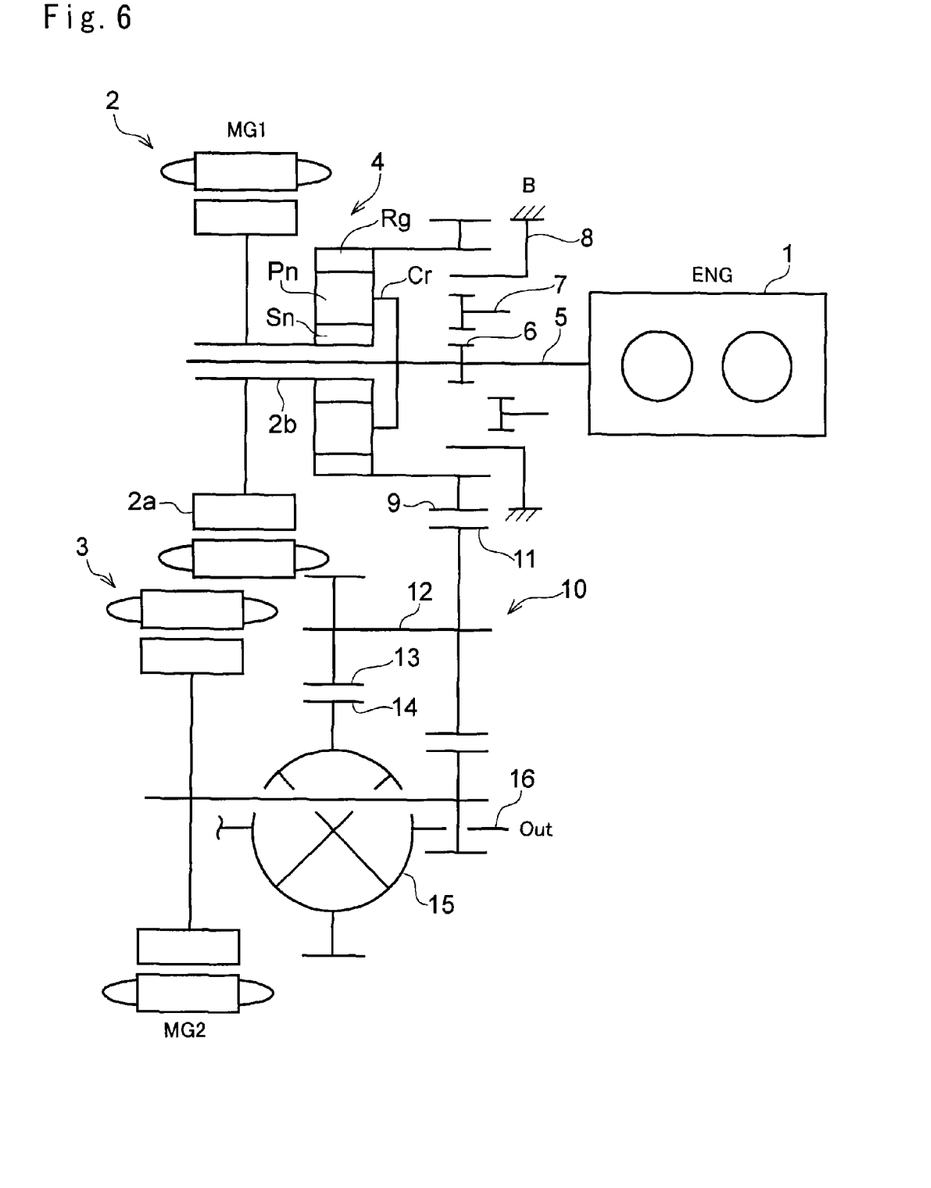
FIG. 6 is a skeleton diagram schematically showing the vehicle to which the control system of the present invention is applied.

Here will be explained a structure of the hybrid vehicle to which the control system according to the preferred example is applied. Referring now to FIG. 6, there is shown a power transmission route of the hybrid vehicle for transmitting power of the prime mover. The hybrid vehicle shown therein is comprised of different kinds of power units such as an engine 1, a first motor/generator 2, and a second motor/generator 3. Specifically, the engine 1 is an internal combustion engine adapted to generate power by burning fuel such as a gasoline engine and a diesel engine. The first motor/generator 2 and the second motor/generator 3 generate power when electric power is supplied thereto, and generate electric power when rotated compulsory by an external force. Thus, those power units serve as a prime mover of the hybrid vehicle for generating a drive force, and the drive force of the prime mover is delivered to the drive wheels through the power transmission route. It is to be noted that the engine 1, the first motor/generator 2 and the second motor/generator 3 are individually abbreviated as "ENG", "MG1" and "MG2" in the accompanying figures. In addition, although not especially illustrated, the first motor/generator 2 and the second motor/generator 3 are individually connected with a battery to exchange power therebetween.

A power distribution device 4 is disposed on the power transmission route between the engine 1 and the drive wheels to distribute power of the engine 1. According to the example shown in FIG. 6, a single-pinion planetary gear unit having three rotary elements is employed as the power distribution device 4. Specifically, the power distribution device 4 is comprised of a sun gear Sn as an external gear, a ring gear Rg as an internal gear arranged concentrically with the sun gear Sn, pinion gears Pn meshing with the sun gear Sn and the ring gear Rg, and a carrier Cr supporting the pinion gears Pn while allowing to rotate and revolve. The sun gear Sn is connected to the first motor/generator 2, the carrier Cr is connected to the engine 1, and the ring gear Rg is connected to the not shown drive wheels through an output member.

Specifically, a rotary shaft 5 integrated with a crank shaft of the engine 1 is connected to the carrier Cr to be rotated integrally therewith by the power of the engine 1. In order to selectively stop rotation of the rotary shaft 5 and the carrier Cr, a brake B as an engagement element is disposed on the power transmission route between the engine 1 and the power distribution device 4. That is, the brake B is brought into disengagement to enable torque transmission between the engine 1 and the power distribution device 4, and brought into engagement to inhibit torque transmission therebetween.

Any kind of dog clutch, friction clutch etc. adapted to selectively allow and stop rotation of the rotary shaft 5 may be used as the brake B. In the example shown in FIG. 6, specifically, a dog clutch is employed to serve as the brake B. As illustrated in FIG. 6, the brake B is comprised of a hub 6 having a spline on its outer circumferential face and disposed on the rotary shaft 5, and a sleeve 7 splined onto the hub 6 in a manner to be reciprocated axially by a not shown actuator. A spline is also formed on an outer circumferential face of the sleeve 7, and a cylindrical member 8 is splined onto the sleeve 7 while being fixed to a fixing portion such as a casing. Thus, the brake B is adapted to stop rotation of the rotary shaft 5 and the carrier Cr by engaging the hub 6 with the fixing portion through the sleeve 7.

An output gear 9 serving as an output member is connected to the ring gear Rg of the power distribution device 4 to be rotated integrally therewith while being meshed with a counter driven gear 11 fitted onto a counter shaft 12. A counter drive gear 13 is also fitted onto the counter shaft 12 while being meshed with a ring gear 14 of a differential 15. Thus, the counter driven gear 11, counter shaft 12 and the counter drive gear 13 forms a counter gear pair 10, and the output gear 9 is also connected to the differential 15 through the counter gear pair 10. That is, the drive force is delivered to the drive wheels from the differential 15 through an axle shaft 16.

The sun gear Sn of the power distribution device 4 is connected to the first motor/generator 2. Specifically, a rotor 2a of the first motor/generator 2 is integrated with a rotary shaft 2b serving as an output shaft, and the rotary shaft 2b is also connected to the sun gear Sn of the power distribution device 4 to be rotated integrally therewith.

Although not especially illustrated, the hybrid vehicle is provided with an electronic control unit (to be abbreviated "ECU" hereinafter) that is configured to control the power units and the engagement elements. The ECU is a microcomputer comprised of a processing unit, a memory unit and an input-output interface, and serves as a controller of the control system of the present invention.

For example, detection signals of speeds of the engine 1 and the motor/generators 2 and 3, a state of charge (to be abbreviated as "SOC" hereinafter) of the battery, a vehicle speed, an acceleration, a depression of an accelerator pedal, a depression of a brake pedal, a rotational speed of the axle shaft 16, a rotational speed of the drive wheel etc. are sent to the ECU. In addition, various kinds of control programs and data are preinstalled in the memory unit of the ECU. Based on those incident signals and the preinstalled data, the ECU sends a command signals to the engine 1, the motor/generators 2 and 3, the brake B and so on.

Further, detection values of the running condition of the vehicle such as a vehicle speed, an SOC, a drive demand, a temperature, and transitional changes of the detection values such as a change rate of the vehicle speed, a change rate of the SOC, a change rate of an acceleration etc. are saved in the memory unit of the ECU. Especially, a database of the transitional change in the SOC and a database of the transitional change in the vehicle speed are stored in the memory device, and analysis values of change rates of those factors may optimally be stored in the memory device. Thus, the control system of the present invention is configured to shift the drive mode based on the information stored in the memory device. To this end, a map shown in FIG. 2 that is to be used to shift the drive mode is also preinstalled in the memory device. Here, it is to be noted that the above-mentioned drive demand is a calculation value that is calculated based on a vehicle speed and an opening degree of an accelerator. Thus, the above-listed detection values include a calculation value such as the drive demand.

Figure 7:
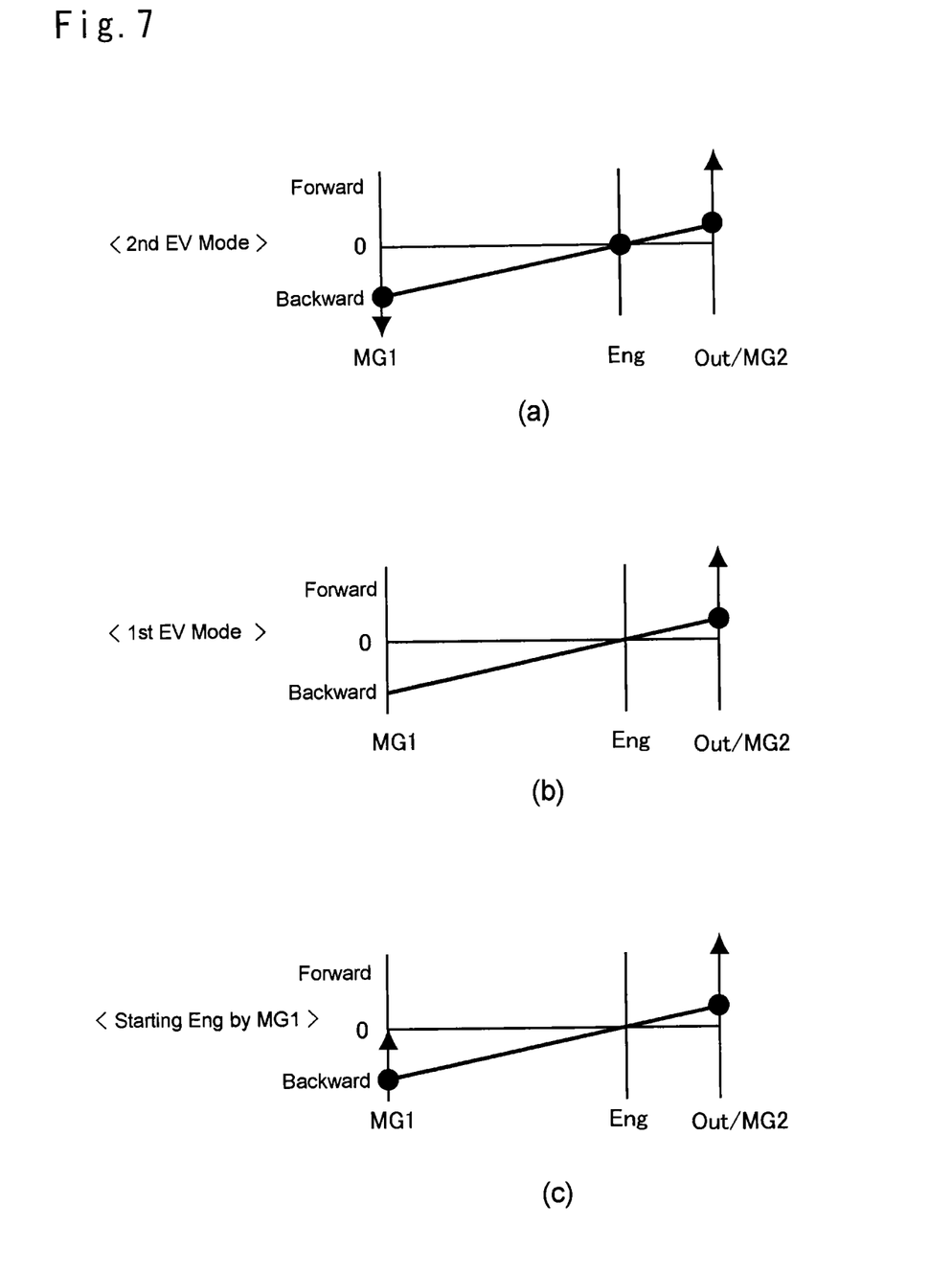
FIG. 7 shows nomographic diagrams of the planetary gear unit serving as the power distribution device in which (a) shows a situation under the second EV mode, (b) shows a situation under the first EV mode, and (c) shows a situation during starting the engine by the motor.

Referring now to FIG. 7, there are shown nomographic diagrams of the planetary gear unit serving as the power distribution device 4. In the nomographic diagrams, the vertical lines represent the rotary elements of the planetary gear unit, and each clearance between those vertical lines is determined depending on a gear ratio between the rotary members. In the nomographic diagram, vertical level on the line represents a rotational speed of the rotary element. Specifically, the nomographic diagram shown in FIG. 7 indicates a relation among the rotary members connected to the engine 1, the first motor/generator 2 and the second motor/generator 3. As described, the single pinion planetary gear unit is used as the power distribution device 4. Accordingly, in the nomographic diagram shown in FIG. 7, the line representing the sun gear Sn connected to the first motor/generator 2 is situated on the left side, the line representing the ring gear Rg connected to the second motor/generator 3 is situated on the right side, and the line representing the carrier Cr that is stopped by the brake B and that is connected to the engine 1 is situated in the middle.

Figure 8:
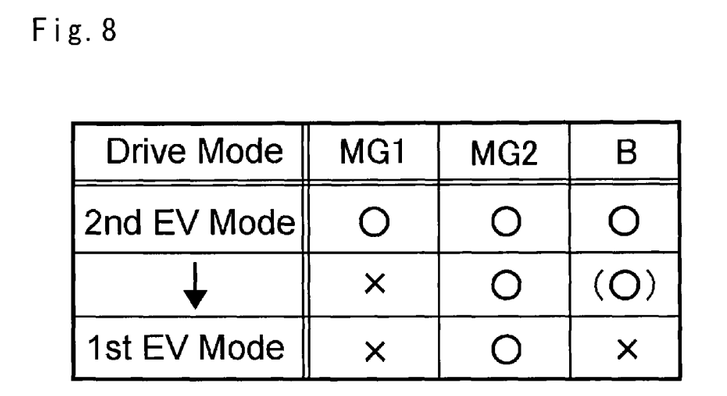
FIG. 8 is a table showing operating states of each motor-generators and an engagement state of the engagement element under each drive mode.

The control system of the present invention is configured to establish at least three kinds of drive modes. For example, the drive mode can be selected from the first EV mode where the vehicle is powered by one of the first motor/generator 2 and the second motor/generator 3, the second EV mode where the vehicle is powered by both of the motor/generators 2 and 3, and the HV mode where the vehicle is powered by both of the engine 1 and the motor/generators 2 and 3. Thus, the EV mode includes the first EV mode and the second EV mode. In addition, an engagement state of the brake B as the engagement element is altered depending on the drive mode. The operating states of the motor/generators 2 and 3, and the engagement state of the brake B are shown in FIG. 8.

Here will be explained the operating states of the motor/generators 2 and 3, and the engagement state of the brake B under the EV mode with reference to the table shown in FIG. 8. In FIG. 8, "O" represents activation of the motor/generators 2, 3 and engagement of the brake B, and "X" represents cessation of the motor/generators 2, 3 and disengagement of the brake B. Hereinafter, the drive modes will be explained in more detail.

First of all, the EV mode of the hybrid vehicle to be achieved by the control system will be explained. As described, the EV mode includes the first EV mode and the second EV mode. The second EV mode is selected at relatively low speed, and under the second EV mode, the vehicle is powered by both first and second motor/generators 2 and 3. Specifically, the second EV mode is established by bringing the brake B into engagement while rotating the first motor/generator 2 in the backward direction and rotating the second motor/generator 3 in the forward direction. Here, it is to be noted that the definition of the "forward direction" is a same direction as the rotational direction of the engine 1, and the definition of the "backward direction" is an opposite direction to the rotational direction of the engine 1. A nomographic diagram of the second EV mode is shown in FIG. 7(*a*). In this case, torque of the first motor/generator 2 is delivered to the sun gear Sn of the power distribution device 4, and torque of the second motor/generator 3 is delivered to the counter gear pair 10 connected to the ring gear Rg of the power distribution device 4.

Under the situation indicated in FIG. 7(*a*), changes in rotational speeds of those rotary elements may be compared to a principle of leverage. In FIG. 7(*a*), specifically, the carrier Cr halted by the brake B serves as the pivot point, the sun gear Sn serves as the point of effort, and ring gear Rg serve as the point of load. Provided that a clearance between the lines representing the carrier Cr and the ring gear Rg is "1", a clearance between the lines representing the carrier Cr and the ring gear Rg is determined based on a gear ratio between the sun gear Sn and the ring gear Rg. Accordingly, the rotational speed of the ring gear Rg is increased with a reduction in the rotational speed of the sun gear Sn. That is, the torque applied to increase the rotational speed of the first motor/generator 2 is delivered to the output gear 9 while being multiplied by the power distribution device 4. In other words, a reaction torque of the first motor/generator 2 in the backward direction, that is, downwardly in FIG. 7 (*a*) is applied to the sun gear Sn so that the torque applied to the output gear 9 is amplified. Thus, under the second EV mode, the drive torque can be multiplied at low speed according to demand of the driver especially to start the vehicle.

Next, the first EV mode where the vehicle is powered only by the second motor/generator 3 will be explained. The first EV mode is selected at higher speed and lower load in comparison with the second EV mode. Specifically, the first EV mode is established by bringing the brake B into disengagement while stopping the engine 1, idling the first motor/generator 2 and rotating the second motor/generator 3 in the forward direction. In this situation, the first motor/generator 2 serves as neither a motor nor a generator. A nomographic diagram of the first EV mode is shown in FIG. 7(*b*). In this case, only the torque of the second motor/generator 3 is delivered to the drive wheels through the counter gear pair 10.

In turn, the HV mode where the engine 1 is operated to serve as the prime mover will be explained. Under the HV mode, power of the engine 1 is distributed through the power distribution device 4 to rotate the first motor/generator 2 to generate power and to rotate the drive wheels. When the drive mode is shifted from the first EV mode to the HV mode, the engine 1 is started by the first motor/generator 2. A nomographic diagram of the HV mode is shown in FIG. 7(*c*). In this case, the torque of the first motor/generator 2 is used to control the rotational speed of the engine 1, and the torque of second motor/generator 3 serving as the motor is also delivered to the drive wheels. The HV mode is selected when the SOC is low or the vehicle speed is high. Under the HV mode, specifically, the vehicle is powered mainly by the engine 1, and the power of the engine 1 is partially converted into an electric power on the way to the drive wheels. Specifically, under the HV mode, the engine 1 is activated while bringing the brake B into disengagement. In this case, the power of the engine 1 is delivered to the power distribution device 4, and further distributed to the first motor/generator 2 side and to the drive wheel side through the output gear 9. Under the HV mode, therefore, the first motor/generator 2 is rotated by the power of the engine 1 to serve as a generator, and an electric power generated by the first motor/generator 2 is delivered to the second motor/generator 3 to operate as a motor.

When the torque of the first motor/generator 2 is applied to the sun gear Sn in the direction opposite to the rotational direction of the torque acting on the carrier Cr, torque of the engine 1 is applied to the ring gear Rg while being multiplied. Consequently, the first motor/generator 2 serves as a generator while applying a reaction torque to the sun gear Sn, and resultant electric power is used to rotate the second motor/generator 3 in the forward direction as a motor. As a result, the torque of the engine 1 is partially delivered from the carrier Cr to the ring gear Rg, and the remaining torque is once converted into electric energy and outputted from the counter gear pair 10 while being converted into mechanical torque again. Under the HV mode, therefore, the engine speed can be controlled arbitrarily by the first motor/generator 2 in a fuel efficient manner so that fuel economy of the vehicle can be improved.

As described, the engine 1 is stopped under the EV mode and operated under the HV mode. That is, in case of shifting the drive mode from the EV mode to the HV mode, the engine 1 has to be started during the shifting operation. However, the control system of the present invention is configured to shift the drive mode to the HV mode from the first EV mode instead of the second EV mode. Specifically, the drive mode is shifted to the HV mode from the second EV mode through the first EV mode. Referring now o FIG. 2, there is shown a map determining boundaries defining regions for selecting the drive modes.

Figure 2:
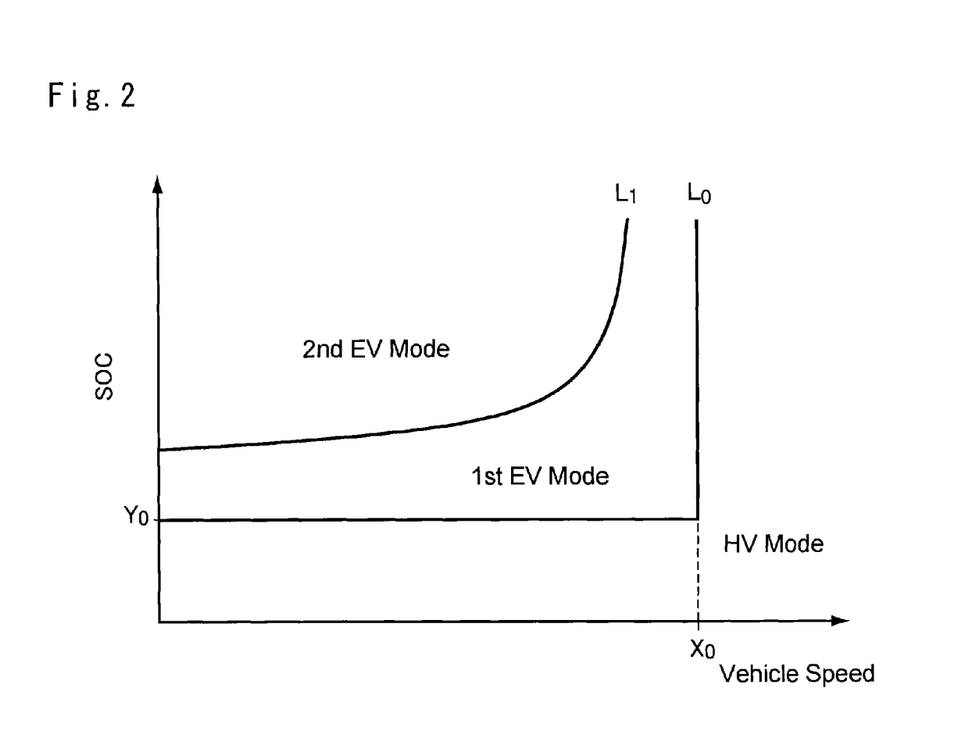
FIG. 2 shows one example of a map determining boundaries defining regions of each drive modes using an SOC and a vehicle speed as parameters.

In the map shown in FIG. 2, specifically, vertical axis represents an SOC and a horizontal axis represents a vehicle speed, and the boundary lines defining the regions of drive modes are determined using those parameters. According to the preferred example, therefore, the drive mode is basically shifted responsive to changes in the SOC and the vehicle speed. However, the electric power is also consumed by electric equipment such as an air conditioner, headlights etc. Therefore, other parameters may also be employed to determine the boundaries instead of the SOC and the vehicle speed. Nonetheless, according to the preferred example, the boundaries defining the regions of the drive modes are determined based at least on the SOC and the vehicle speed so that the drive mode is shifted responsive to changes in those parameters.

According to the preferred example, an HV threshold and an EV threshold are used to shift the drive mode. Specifically, the HV threshold is the boundary $L_0$ drawn between a first EV mode region and an HV mode region in FIG. 2. In other words, the HV threshold is a criterion for determining start-up of the engine 1 to shift the drive mode between the first EV mode and the HV mode. On the other hand, the EV threshold is the boundary $L_1$ drawn between the first EV mode region and a second EV mode region in FIG. 2. That is, the EV threshold is a criterion for shifting the drive mode between the first EV mode and the second EV mode. That is, those thresholds are criterions used in the control for shifting the drive mode.

The boundary $L_0$ as the HV threshold is determined using the following parameters such as an HV threshold value $X_0$ of the vehicle speed and an HV threshold value $Y_0$ of the SOC. The drive mode is shifted to the HV mode irrespective of a level of the SOC if the vehicle speed is higher than the HV threshold value $X_0$, and the drive mode is also shifted to the HV mode irrespective of the vehicle speed if a level of the SOC is lower than the HV threshold value $Y_0$. In other words, the drive mode is shifted to the EV mode if the vehicle speed is lower than the HV threshold value $X_0$, and the SOC is higher than the HV threshold value $Y_0$. For example, when the vehicle speed exceeds the HV threshold value $X_0$ under a condition where the vehicle runs under the first EV mode and the SOC is higher than the HV threshold value $Y_0$, the drive mode is shifted to the HV mode. Likewise, the drive mode is also shifted to the HV mode when the SOC falls below the HV threshold value $Y_0$ under a condition where the vehicle runs under the first EV mode at a speed lower than the HV threshold value $X_0$.

The boundary $L_1$ as the EV threshold is determined using the following parameters such as an HV threshold value $X_1$ of the vehicle speed and an EV threshold value $Y_1$ of the SOC. Specifically, the boundary $L_1$ is drawn in a low speed side and high SOC side of the boundary $L_0$. That is, the EV threshold value $Y_1$ of the SOC is set to a higher level than the HV threshold value $Y_0$ with respect to a predetermined vehicle speed lower than the HV threshold value $X_0$. Likewise, the HV threshold value $X_1$ of the vehicle speed is set to the lower level than the HV threshold value $X_0$ with respect to a predetermined SOC higher than the HV threshold value $Y_0$. In addition, the boundary $L_1$ is drawn in a manner such that the EV threshold value $Y_1$ of the SOC is raised from the low speed side to the high speed side.

The control system of the present invention is configured to shift the drive mode not only from the first EV mode to the HV mode but also from the first EV mode to the second EV mode. For example, the drive mode is shifted from the second EV mode to the first EV mode given that the engine 1 is expected to be started based on a comparison between the parameters and thresholds defining the drive mode. Then, if the parameters are further changed, the drive mode is allowed to be shifted from the first EV mode to the second EV mode.

Figure 1:
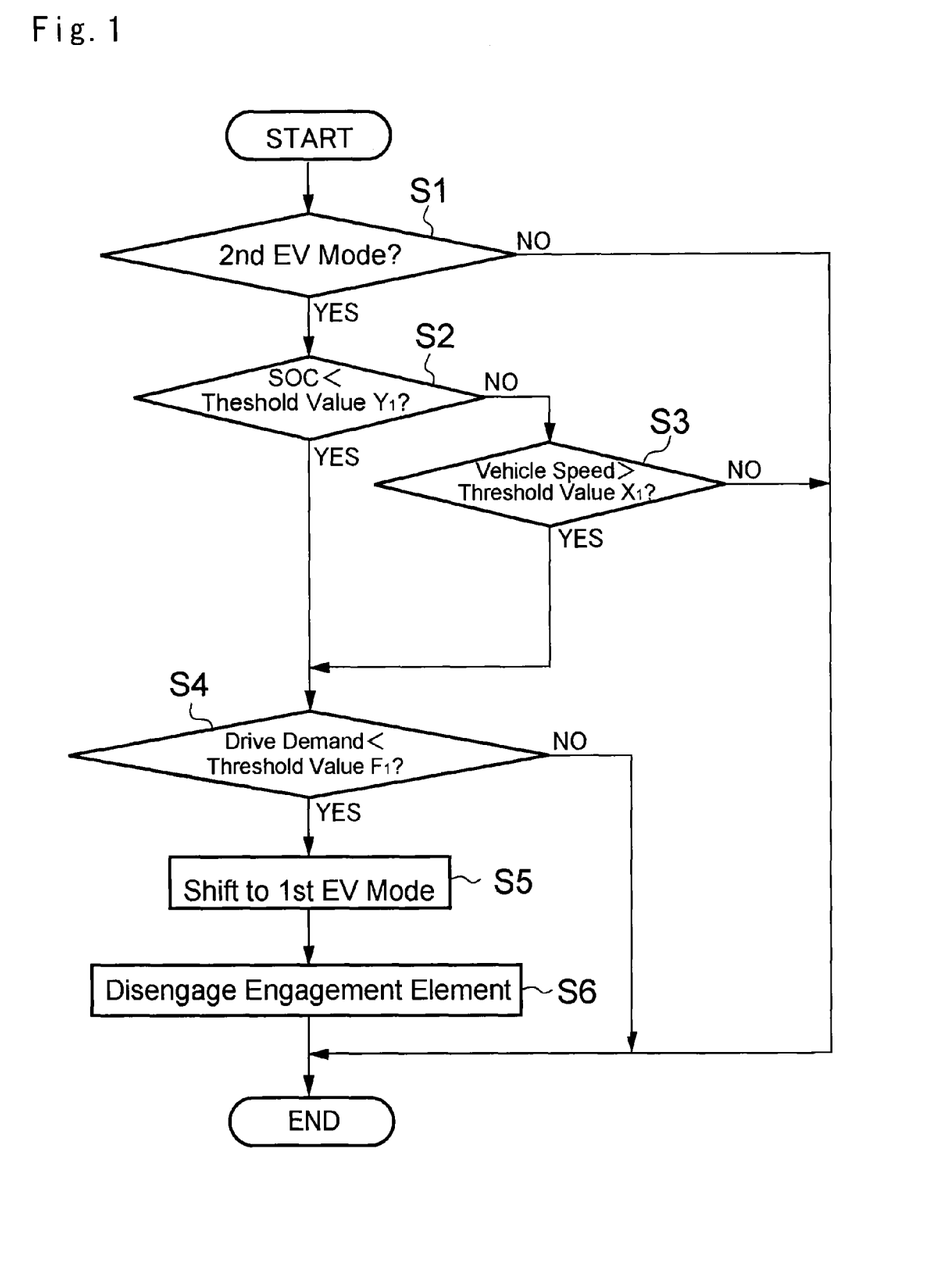
FIG. 1 is a flowchart showing a control example carried out by the control system for a hybrid vehicle according to the present invention.

Next, the control for shifting the drive mode will be explained with reference to FIG. 1. Specifically, FIG. 1 shows a control example for shifting the drive mode during propelling the vehicle by the motor/generators 2 and 3 while stopping the engine 1. That is, FIG. 1 shows a control example for shifting the drive mode preliminary to the first EV mode prior to starting the engine 1, and the control shown therein is carried out by the ECU. First of all, it is determined whether or not the vehicle is propelled under the second EV mode (at step S1). Specifically, the determination of step S1 can be made based on a mode signal from the ECU with reference to the map shown in FIG. 2. If the drive mode is not the second EV mode so that the answer of step S1 is NO, the routine is returned without carrying out any specific controls.

By contrast, if the vehicle is propelled under the second EV mode so that the answer of step S1 is YES, then it is determined whether or not conditions to shift the drive mode to the first EV mode where the vehicle is powered only by the second motor/generator 3 are satisfied. According to the example shown in FIG. 1, an SOC, a vehicle speed, a drive demand are used as parameters to determine a satisfaction of the conditions at step S1. However, an optional parameters such as temperatures of the motor/generators 2, 3 and an inverter may also be used at step S1. For example, given that the temperature is used as the parameter, one of the conditions of the determination to shift the drive mode from the second EV mode to the first EV mode is satisfied when the temperature exceeds the HV threshold value of the temperature. According to the example shown in FIG. 1, specifically, it is determined whether or not the SOC is lower than the EV threshold value $Y_1$ of the SOC (at step S2). If the SOC is higher than the EV threshold value $Y_1$ so that the answer of step S2 is NO, it is determined whether or not the vehicle speed is higher than the HV threshold value $X_1$ of the vehicle speed (at step S3). If the vehicle speed is lower than the HV threshold value $X_1$ so that the answer of step S3 is NO, the routine is returned without carrying out any specific controls.

If any of the answers of step S2 and S3 is YES, that is, if the SOC is lower than the EV threshold value $Y_1$, or if vehicle speed is higher than the HV threshold value $X_1$, it is determined whether or not the drive demand is smaller than a predetermined threshold value $F_1$ (at step S4). To this end, the drive demand can be determined based on an opening degree of the accelerator. Specifically, the threshold value $F_1$ is also a criterion to shift the drive mode from the second EV mode to the first EV mode. For example, the threshold value $F_1$ may be set to a drive force possible to propel the vehicle only by the second motor/generator 3. Here, it is to be noted that the order to carry out steps S2 to S4 may be switched according to need. For example, it is also possible to carry out step S4 to determine whether or not the drive demand is smaller than the threshold value $F_1$ first. In this case, if the answer of step S4 is YES, then the determinations of steps S2 and S3 will be carried out.

If the drive demand is smaller than a predetermined threshold value $F_1$ so that the answer of step S4 is YES, the drive mode is shifted from the second EV mode to the first EV mode (at step S5). That is, if a relatively large drive force is required, the engine is expected to be started to generate a drive force, therefore, the drive mode is shifted preliminary to the first EV mode prior to staring the engine 1. Then, in order to start the engine 1, the engagement element being in engagement during the second EV mode is bought into disengagement upon satisfaction of the determination to shift to the first EV mode (at step S6). Specifically, the brake B is brought into disengagement so that cranking (i.e., motoring) of the engine 1 can be executed by the first motor/generator 2.

Figure 3:
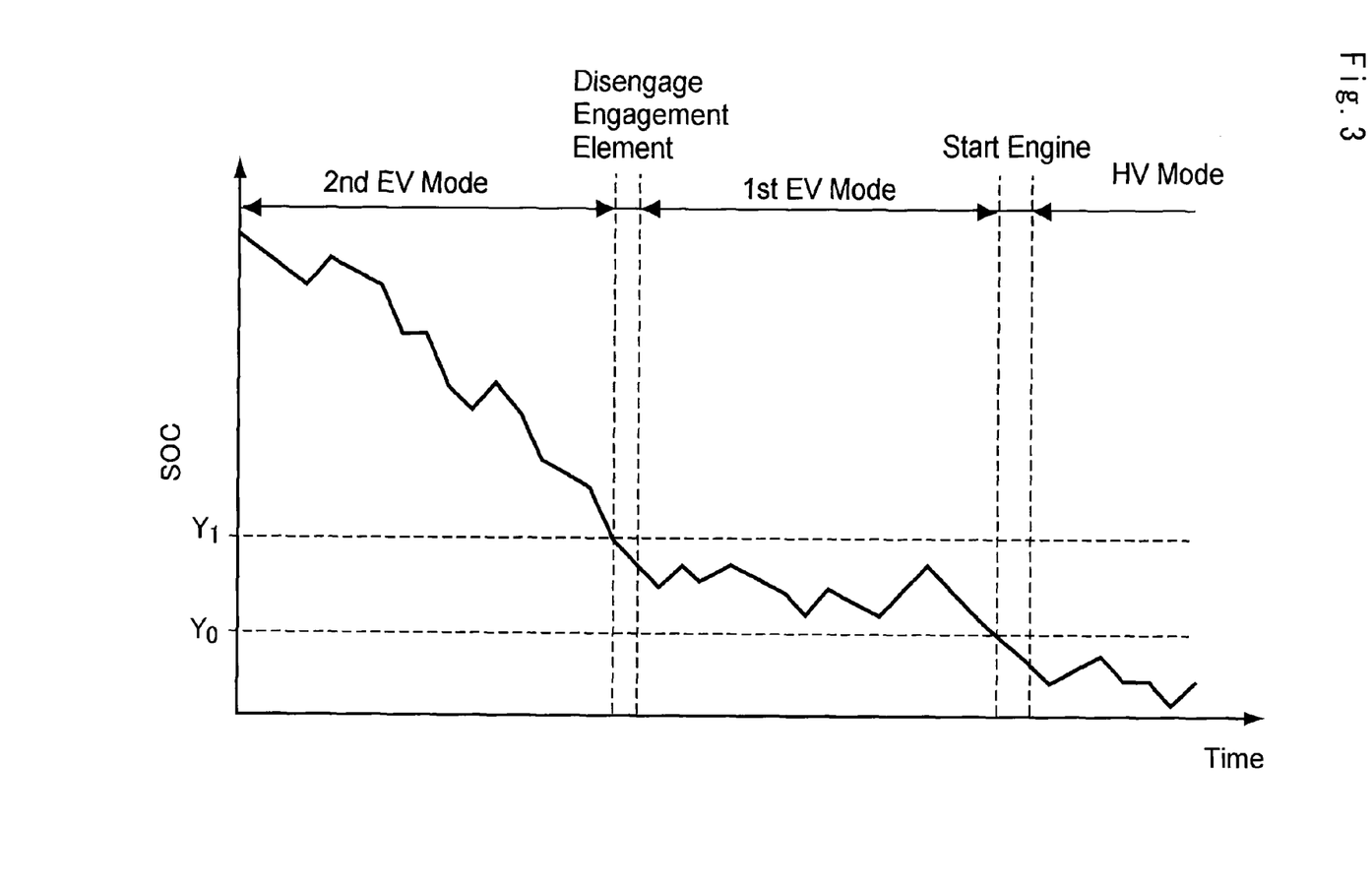
FIG. 3 is a time chart showing changes in a remaining battery level during shifting the drive mode.

Next, a process of shifting the drive mode depending on the running condition will be explained with reference to FIGS. 3 to 5. Referring now to FIG. 3, there is shown a time chart indicating the shifting operation of the drive mode based on a change in the SOC. As can be seen from FIG. 3, since both of the first and the second motor/generators 2 and 3 are operated as motors under the second EV mode, the battery is required to discharge the electric power in large amounts and the SOC is therefore lowered gradually. When the SOC is lowered to the EV threshold value $Y_1$, the drive mode is shifted from the second EV mode to the first EV mode. In this situation, since an electric generation is not demanded, the engine 1 is still stopped by stopping fuel supply thereto while being idled. In addition, the engagement element that has been stopping rotation of the engine 1 during the second EV mode is brought into disengagement on the occasion of shifting to the first EV mode.

Under the first EV mode, the second motor/generator 3 is used as a power source and the vehicle is powered only by the second motor/generator 3, therefore, the SOC is further lowered. Consequently, when the SOC falls below the HV threshold value $Y_0$, the drive mode is shifted from the first EV mode to the HV mode. Specifically, the drive mode is shifted to the HV mode by rotating the stopping engine 1 by the torque of the first motor/generator 2, and supplying fuel thereto when a rotational speed of the engine 1 reaches an ignition speed while controlling the rotational speed by the first motor/generator 2. In this situation, the second motor/generator 3 has already been generating the drive force for propelling the vehicle, and the first motor/generator 2 that has been stopped starts generating a torque for cranking the engine 1. For this reason, the drive force for propelling the vehicle will not be changed temporarily so that shocks and uncomfortable feeling can be reduced. That is, according to the preferred example, the drive mode is shifted to the first EV mode prior to start the engine 1 while bringing the brake into disengagement for the preparation of motoring of the engine 1. In other words, the standby mode for the motoring of the engine 1 can be established. Therefore, motoring of the engine 1 can be commenced immediately upon satisfaction of the starting condition so that the engine 1 is allowed to be started without delay.

Figure 5:
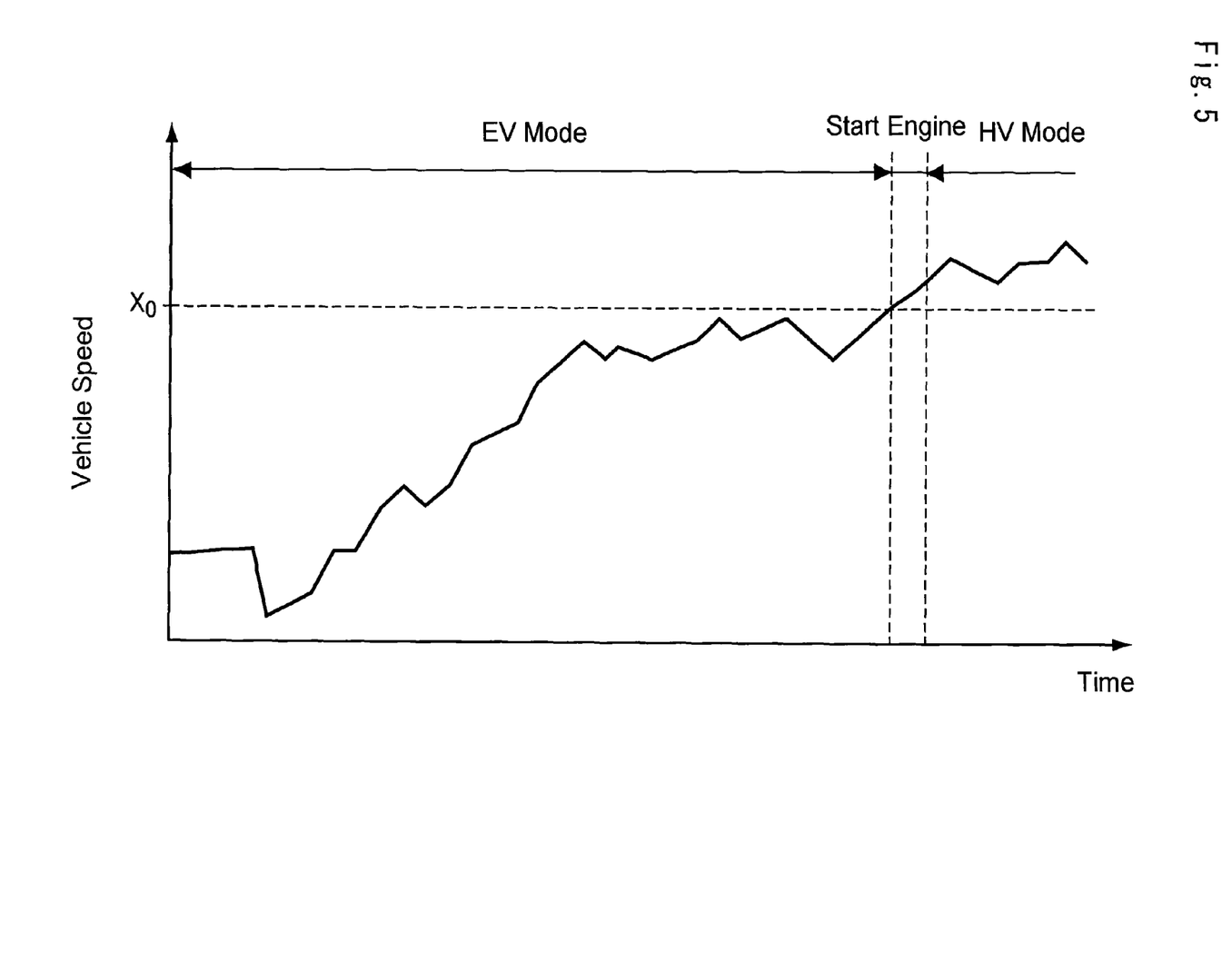
FIG. 5 is a time chart showing changes in the vehicle speed during shifting the drive mode.

Referring now to FIG. 5, there is shown another time chart indicating the shifting operation of the drive mode based on a change in the vehicle speed. According to the example shown in FIG. 5, the drive mode is shifted from the EV mode to the HV mode when the vehicle speed exceeds the HV threshold value $X_1$ under the condition that the SOC is sufficiently high to propel the vehicle. To this end, the stopping engine 1 is also started by the first motor/generator 2 during the process of shifting from the first EV mode to the HV mode. In this case, specifically, the drive mode is also shifted to the first EV mode while disengaging the brake B prior to starting the engine 1 so that the engine 1 is idled. Therefore, motoring of the engine 1 can be commenced without delay and a temporal drop in the drive force can be avoided.

Figure 4:
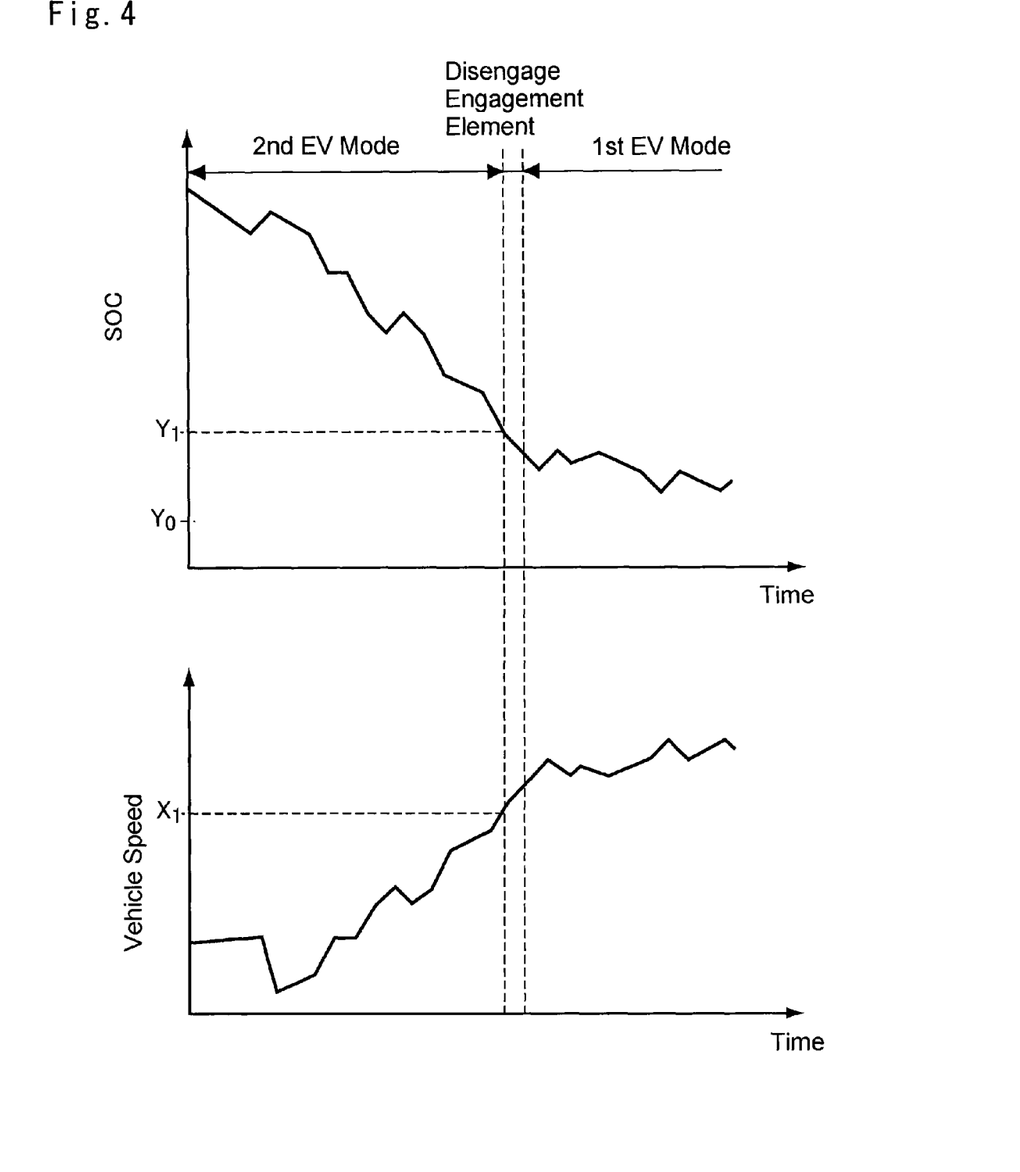
FIG. 4 is a time chart showing changes in the vehicle speed and the SOC during shifting the drive mode.

In turn, referring to FIG. 4, there is shown a time chart indicating the shifting operation of the drive mode from the second EV mode to the first EV mode based on a change in the SOC and the vehicle speed. According to the example shown in FIG. 4, the second EV mode is selected under the condition where the SOC is sufficiently high at relatively low speed. In this situation, the electric consumptions of the motor/generators 2 and 3 are increased with an increase in the vehicle speed and the SOC is decreased gradually. When the SOC falls below the EV threshold value $Y_1$ at the current vehicle speed, the drive mode is shifted to the first EV mode. During the shifting operation from the second EV mode to the first EV mode, the brake B that has been in engagement is brought into disengagement.

Next, here will be explained a shifting of the boundary defining the first EV mode and the second EV mode with reference to FIG. 9. The boundary $L_1$ defining the first EV mode and the second EV mode is not necessarily to be fixed and may be shifted depending on a running condition of the vehicle and a road condition. Specifically, the EV threshold value $Y_1$ of the SOC at a predetermined speed is shifted depending on the above-mentioned conditions. According to the example shown in FIG. 9, the boundary $L_1$ determined based on the EV threshold value $Y_1$ of the SOC and the EV threshold value $X_1$ of the vehicle speed is shifted in accordance with change rates or detection values of the vehicle speed and the SOC. For example, under the condition where the SOC is decreased significantly, the SOC would fall rapidly. In this case, the boundary $L_1$ is shifted in a manner such that the EV threshold value $Y_1$ of the SOC is increased. In other words, the boundary $L_1$ is shifted in a manner such that a difference between the boundary $L_1$ and the boundary $L_0$ defining the HV region at a predetermined vehicle speed is widened. Likewise, under the condition where the vehicle speed is increased significantly, the boundary $L_1$ is also shifted in the above-explained manner. Although not especially shown in FIG. 9, the boundary thus shifted in manner such that a difference between the boundary $L_1$ and the boundary $L_0$ is widened will be called the boundary $L_3$.

Figure 9:
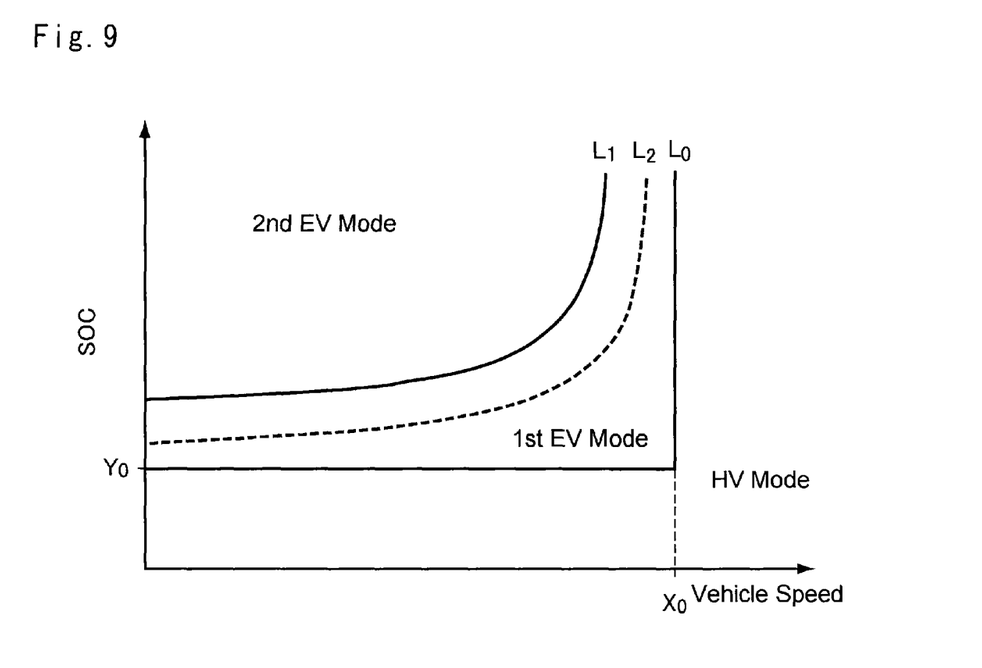
FIG. 9 shows one example of a map for moving the boundary depending on a running condition of the vehicle.

By contrast, the under the condition where the decreasing rate of the SOC and the increasing rate of the vehicle speed are moderate, the EV boundary is shifted in a manner such that the EV threshold value $Y_1$ of the SOC is reduced to be smaller than that of the boundary $L_1$ as represented by a broken line $L_2$ in FIG. 9. In this case, even if the SOC falls below the EV threshold value $Y_1$ of the SOC but still higher than a not shown EV threshold value $Y_2$ of the SOC on the EV boundary thus shifted downwardly, the second EV mode can be continued to operate the motor/generators in an electrically efficient manner. Thus, under the condition where the SOC falls below the EV threshold value $Y_1$ on the boundary $L_1$, the second EV mode can be continued longer in comparison with the case in which the EV threshold value $Y_1$ is a fixed value.

As described, a direction to shift the EV boundary $L_1$ is determined based on the change rates of the SOC and the vehicle speed as the above-mentioned boundaries $L_2$ and $L_3$. In addition, a shifting amount of the EV boundary $L_1$ may also be determined based on the change rates of the SOC and the vehicle speed. Here will be explained a shifting amount of a case in which the EV boundary is shifted from the boundary $L_1$ to the boundary $L_2$. As described, in case the decreasing rate of the SOC and the increasing rate of the vehicle speed are moderate, the EV boundary $L_1$ is shifted to the boundary $L_2$. In this case, if the decreasing rate of the SOC is relatively small for example, the EV boundary is shifted in relatively large amount to be close to the HV boundary $L_0$ in comparison with a case in which the decreasing rate of the SOC is relatively is large. Likewise, if the increasing rate of the vehicle speed is relatively small, the EV boundary is also shifted to be closely to the HV boundary $L_0$.

Figure 10:
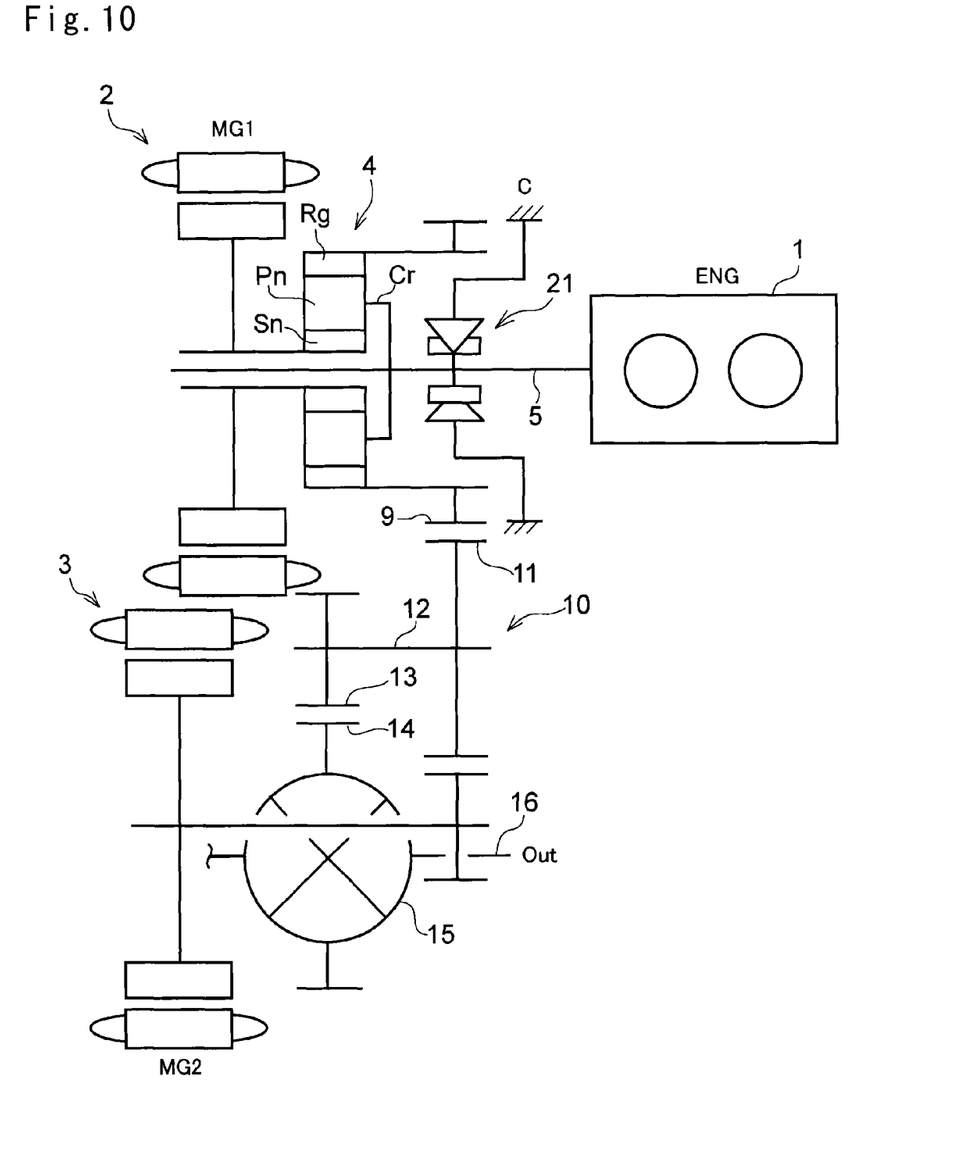
FIG. 10 is a skeleton diagram schematically showing the vehicle to which the control system of another example is applied.

Next, modified examples of structures of the hybrid vehicles to which the control system of the present invention is applied will be explained with reference to FIGS. 10 and 11. Specifically, other kinds of engagement elements are used in the below-explained modifications. In the following explanation, common reference numerals are allotted to the elements in common with those of the first example, and detailed explanation for those common elements will be omitted. Referring now to FIG. 10, there is shown a skeleton diagram of a hybrid vehicle in which a clutch device is used as the engagement element. For example, in the example shown in FIG. 10, a friction clutch, a one-way clutch etc. may be used as a clutch C. Specifically, the clutch C is comprised of a one-way clutch 21 adapted to selectively stop rotation of the rotary shaft 5 of the engine 1. Thus, in the example shown in FIG. 10, the clutch C having the one-way clutch 21 is used instead of the brake B shown in FIGS. 6 and 8. As the foregoing example, an actuation of the clutch C is controlled by the above-explained ECU. Specifically, the clutch C is brought into engagement to stop rotation of the engine 1 under the second EV mode, and brought into disengagement during the shifting operation from the first EV mode to the HV mode. The starting control of the engine 1 and a speed control of the first motor/generator 2 are also carried out in the same manners as the foregoing example.

Figure 11:
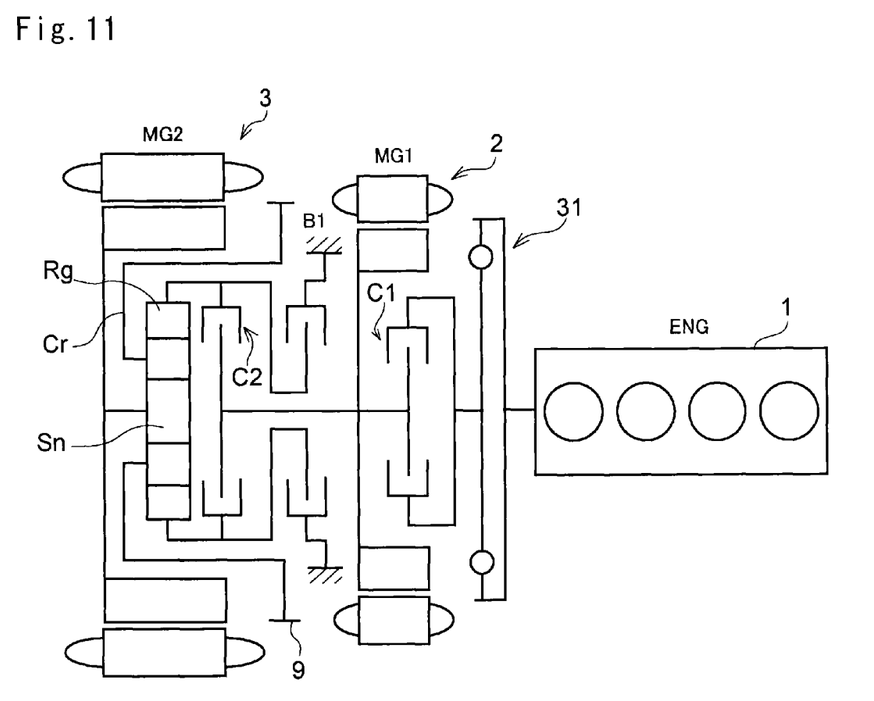
FIG. 11 is a skeleton diagram schematically showing the vehicle to which the control system of still another example is applied.

In turn, FIG. 11 is a skeleton diagram showing an example of a hybrid vehicle in which an arrangement of the rotary members is altered and in which of a plurality of engagement elements are employed to selectively connect the power transmission route. According to the example shown in FIG. 11, the sun gear Sn of the power distribution device 4 is connected to the second motor/generator 3, the ring gear Rg is connected to the engine 1 and the first motor/generator 2, and the carrier Cr is connected to the output gear 9. That is, the engine 1 is connected to the ring gear Rg through clutches C1 and C2, and the first motor/generator 2 is connected to the ring gear Rg through the clutch C2. In addition, a brake B1 is arranged to selectively connect the ring gear Rg to the fixing member such as a housing. That is, a rotation of the ring gear Rg is selectively stopped by the brake B1. Thus, the engine 1 is disconnected form the power train by the clutch C1, and a torque converter 31 may be disposed between the engine 1 and the clutch C1.

As the foregoing examples, according to the example shown in FIG. 11, the drive mode can be shifted among a plurality of modes. For example, under the second EV mode, the motor/generators 2 and 3 are used as prime movers, and the brake B1 and the clutch C1 are disengaged and the clutch C2 is engaged. Under the first EV mode, only the second motor/generator 3 is used as a prime mover, and the brake B1 is brought into engagement to use the ring gear Rg as a reaction element. Under the first EV mode, therefore, torque of the motor/generator 3 is applied to the sun gear Sn, and further delivered from the carrier Cr to the drive wheels through the output gear 9 while being multiplied by the power distribution device 4. In addition, under the first EV mode, the clutch C1 is brought into engagement while bringing the clutch C2 into disengagement. Accordingly, the clutch C1 is brought into disengagement and the brake B1 is bought into engagement during shifting from the second EV mode to the first EV mode. Consequently, the first motor/generator 2 is allowed to be used to crank the engine 1 during a shifting operation from the first EV mode where the clutch C1 is thus engaged to the HV mode. For this reason, response of the shifting operation can be improved.

Thus, according to the control system of the present invention, the first motor/generator 2 and the engine 1 are connected to each other under the first EV mode. Therefore, when shifting from the first EV mode to the HV mode, the cranking of the engine 1 can be carried out by lowering a negative speed of the first motor/generator 2 or increasing positive speeds of the motor/generator 2 and 3. That is, such shifting operation can be carried out without altering engagement states of the engagement elements. For this reason, the shifting operation of the drive mode can be carried out promptly without delay so that drivability can be improved.

Here will be explained a relation between the foregoing examples and the present invention. The functional means of the ECU for carrying out the controls of steps S2 to S4 in FIG. 1 serve as the prediction means of the invention, the functional means for carrying out the control of step S5 in FIG. 1 serves as the shifting means of the invention, the functional means for activating the first motor/generator 2 to carry out a cranking of the engine 1 serves as the stating means of the invention, the functional means for shifting the EV boundary $L_1$ serves as the threshold altering means of the invention, and the functional means for carrying out the control of step S6 serves as the disengaging means of the invention.

While the control system for hybrid vehicles has been described in reference to the illustrated embodiment, the present invention can be further modified within the spirit of the disclosure.

For example, the HV mode may be split into a plurality of modes such as a mode adapted for a low-speed and high-load condition, and a mode adapted for an overdriving condition where the speed ratio is smaller than 1.

In addition to say, while in the foregoing example, a comparison result of the parameters with the thresholds has been expressed as "higher" and "lower", those expressions such as "the vehicle speed is higher than the threshold", "the temperature is higher than the threshold", "the SOC is higher than the threshold" etc. will not literally limit the scope of the invention. Also, definition of the state of charge that has been abbreviated as "SOC" includes not only a remaining electric power in the battery but also other parameters such as a charging rate, an allowable output etc. of the battery.

The invention claimed is:
1. A control system for a hybrid vehicle having an internal combustion engine and two motors, that is configured to select a drive mode from a mode where the vehicle is powered by the engine, and a mode where the vehicle is powered by at least one of the motors while stopping the engine, comprising:
    a controller configured to
        predict a fact that the engine is expected to be started based on a detection value representing a running condition of the vehicle, during propelling the vehicle by the two motors while stopping the engine;
        shift the drive mode to a mode where the vehicle is powered by one of the motors without using a power of the other motor to be used to start the engine; and
        start the engine upon satisfaction of a condition for propelling the vehicle by the power of the other motor, wherein the detection value includes at least one of a state of charge of a battery for supplying an electric power to the motors, a vehicle speed, a temperature of the motor, and a drive demand, the controller is configured to predict the fact that the engine is expected to be started given that at least one of the state of charge of the battery is lower than a first state of charge threshold value, the vehicle speed is higher than a vehicle speed threshold value, the temperature of the motor is higher than a motor temperature threshold value, and the drive demand is smaller than a drive demand threshold value, the controller is configured to start the engine if the state of charge of the battery is lower than a second state of charge threshold value, the first state of charge threshold value is larger than the second state of charge threshold value, and the controller is configured to alter the first state of charge threshold value such that the first state of charge threshold value increases from a low speed side to a high speed side.

2. The control system for a hybrid vehicle as claimed in claim 1, further comprising:

an engagement element adapted to selectively halt a rotary shaft of the engine, wherein the controller is further configured to bring the engagement element into disengagement in case the engine is expected to be started.

3. A control system for a hybrid vehicle having an internal combustion engine and two motors, that is configured to select a drive mode from a mode where the vehicle is powered by the engine, and a mode where the vehicle is powered by at least one of the motors while stopping the engine, comprising:

a controller configured to predict a fact that the engine is expected to be started based on a detection value representing a running condition of the vehicle, during propelling the vehicle by the two motors while stopping the engine;

shift the drive mode to a mode where the vehicle is powered by one of the motors without using a power of the other motor to be used to start the engine;

start the engine upon satisfaction of a condition for propelling the vehicle by the power of the other motor;

save a change rate of a state of charge of a battery for supplying an electric power to the motors; and alter a first state of charge threshold value based on the change rate of the state of charge of the battery, and shift the first state of charge threshold value if a decreasing rate of the state of charge is relatively large to a higher value than that of a case in which the decreasing rate of the state of charge is relatively small, wherein the detection value includes at least one of the state of charge of the battery, a vehicle speed, a temperature of the motor, and a drive demand, the controller is configured to predict the fact that the engine is expected to be started given that at least one of the state of charge of the battery is lower than the first state of charge threshold value, the vehicle speed is higher than a vehicle speed threshold value, the temperature of the motor is higher than a motor temperature threshold value, and the drive demand is smaller than a drive demand threshold value, the controller is configured to start the engine if the state of charge of the battery is lower than a second state of charge threshold value, and the first state of charge threshold value is larger than the second state of charge threshold value.

4. The control system for a hybrid vehicle as claimed in claim 3, further comprising:

an engagement element adapted to selectively halt a rotary shaft of the engine, wherein the controller is further configured to bring the engagement element into disengagement in case the engine is expected to be started.

5. A control system for a hybrid vehicle having an internal combustion engine and two motors, that is configured to select a drive mode from a mode where the vehicle is powered by the engine, and a mode where the vehicle is powered by at least one of the motors while stopping the engine, comprising:

a controller configured to predict a fact that the engine is expected to be started based on a detection value representing a running condition of the vehicle, during propelling the vehicle by the two motors while stopping the engine;

shift the drive mode to a mode where the vehicle is powered by one of the motors without using a power of the other motor to be used to start the engine;

start the engine upon satisfaction of a condition for propelling the vehicle by the power of the other motor, save a change rate of a vehicle speed; and alter a first state of charge threshold value of a state of charge of a battery for supplying an electric power to the motors based on the change rate of the vehicle speed, and shift the first state of charge threshold value if a decreasing rate of the vehicle speed is relatively large to a higher value than that of a case in which the decreasing rate of the vehicle speed is relatively small, wherein the detection value includes at least one of the state of charge of the battery, the vehicle speed, a temperature of the motor, and a drive demand, the controller is configured to predict the fact that the engine is expected to be started given that at least one of the state of charge of the battery is lower than the first state of charge threshold value, the vehicle speed is higher than a vehicle speed threshold value, the temperature of the motor is higher than a motor temperature threshold value, and the drive demand is smaller than a drive demand threshold value, the controller is configured to start the engine if the state of charge of the battery is lower than a second state of charge threshold value, and the first state of charge threshold value is larger than the second state of charge threshold value.

6. The control system for a hybrid vehicle as claimed in claim 5, further comprising:

an engagement element adapted to selectively halt a rotary shaft of the engine, wherein the controller is further configured to bring the engagement element into disengagement in case the engine is expected to be started.

* * * * *